Aug. 25, 1964
F. P. RUST ET AL
3,145,622
FIELD MACHINING APPARATUS
Filed March 5, 1962
3 Sheets-Sheet 1
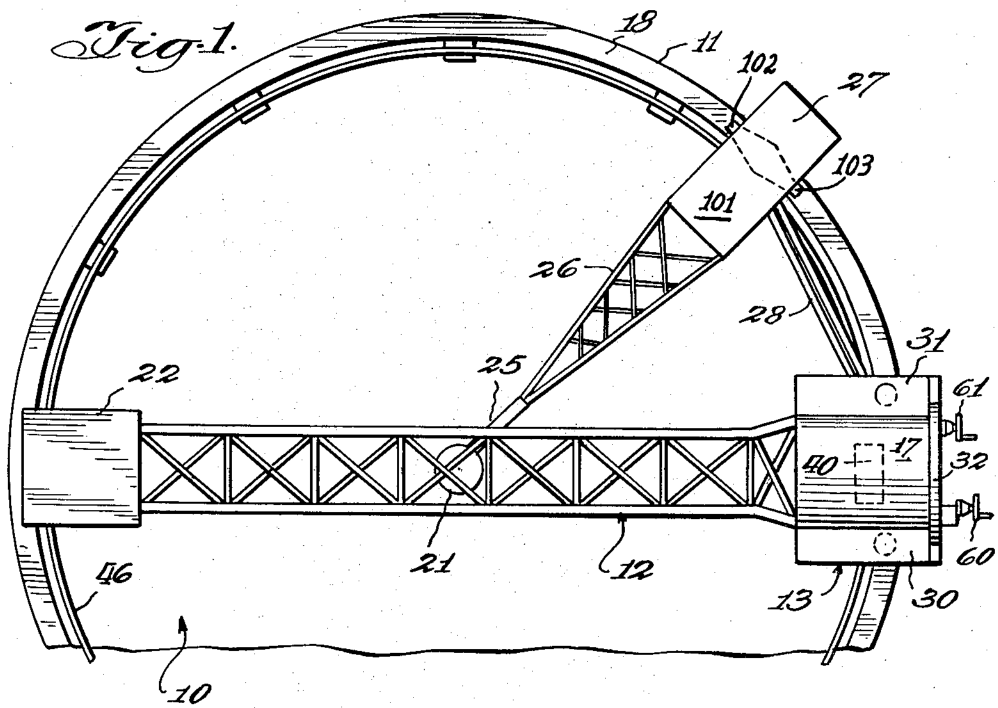
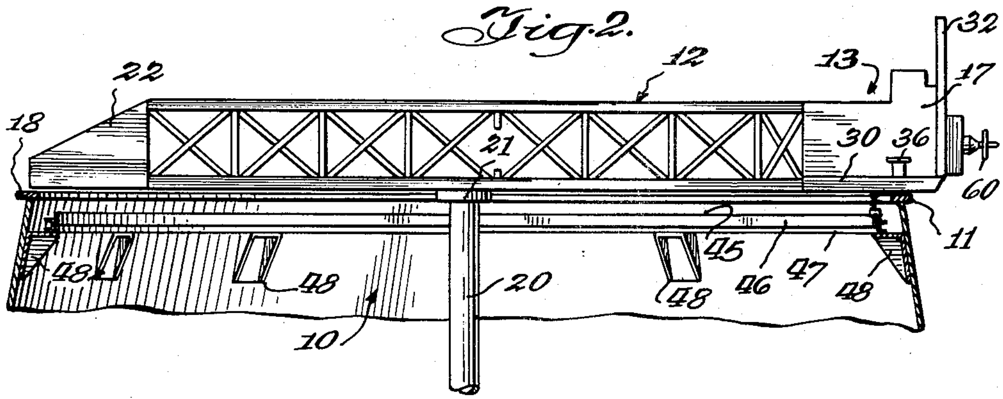
Inventors
Frank P. Rust
Edwin S. Olsen
By Merriam, Smith & Marshall.
attorneys Aug. 25, 1964 F. P. RUST ET AL 3,145,622
FIELD MACHINING APPARATUS
Filed March 5, 1962 3 Sheets-Sheet 2
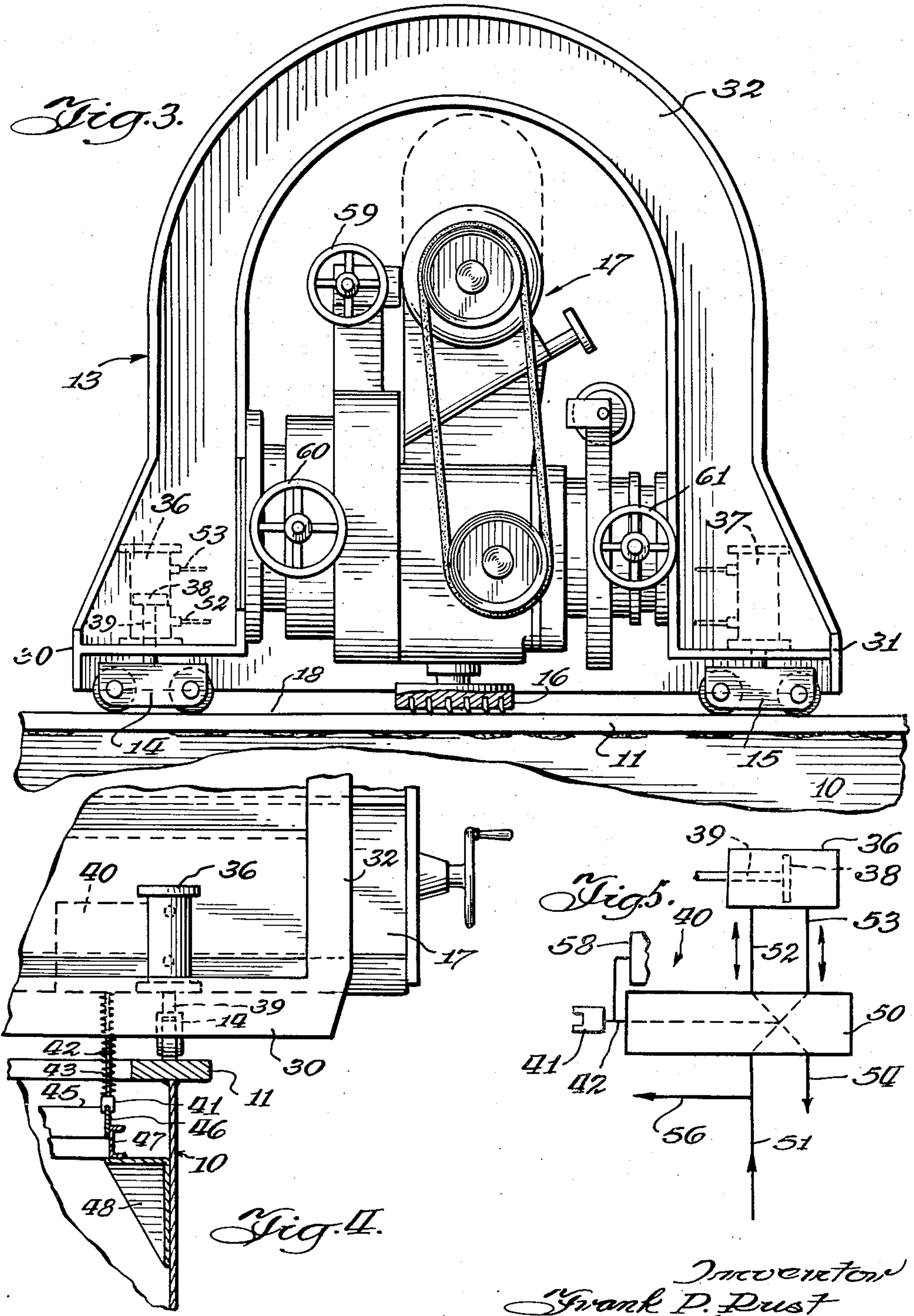
Inventors
Frank P. Rust
Edwin S. Olsen
By Merriam, Smith & Marshall
Attorneys FIELD MACHINING APPARATUS
Filed March 5, 1962 3 Sheets-Sheet 3
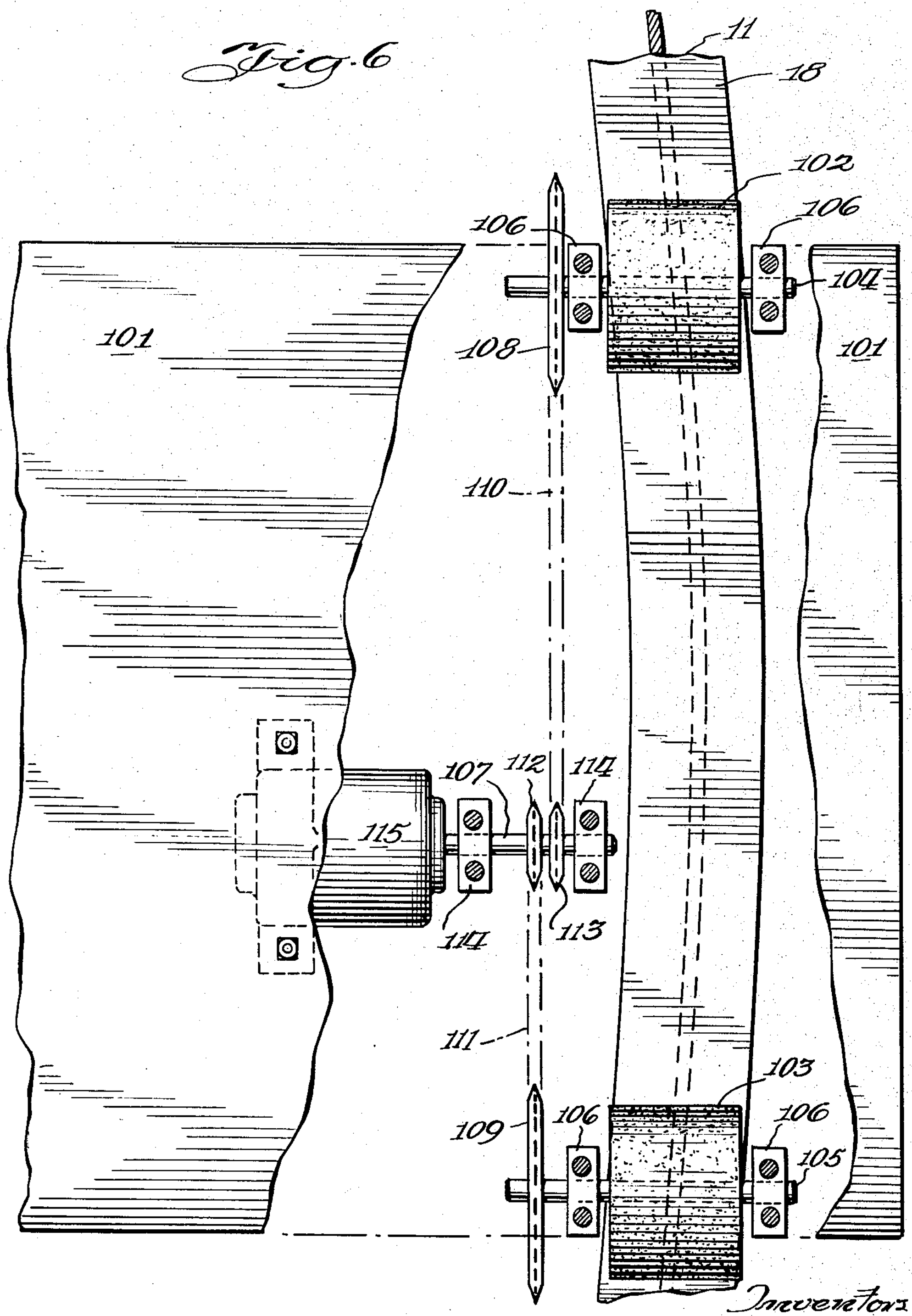
Inventors
Frank P. Rust
Edwin S. Olsen
By Merriam, Smith & Marshall attorneys United States Patent Office 3,145,622 Patented Aug. 25, 1964

3,145,622
FIELD MACHINING APPARATUS

Frank P. Rust and Edwin S. Olsen, Salt Lake City, Utah, assignors to Chicago Bridge & Iron Company, Chicago, Ill., a corporation of Illinois Filed Mar. 5, 1962, Ser. No. 177,488
10 Claims. (Cl. 90—13)

The present invention relates generally to field machining apparatus, and more particularly to apparatus for field machining extremely large workpieces too large to be readily transportable in the assembled condition.

Examples of such extremely large workpieces include large flanged pressure and vacuum vessels used in petroleum refining and in the petro-chemical industry, and environmental chambers for testing large objects under very low pressure and temperature conditions. The walls of such a chamber are constructed of steel plate, and the chamber may be 50 feet or more in width. A typical embodiment comprises a lower spherical section terminating at an upper peripheral flange and an upper spherical section having a lower peripheral flange engageable with the upper flange of the lower section when the two spherical sections are joined together.

To maintain the desired extremely low pressures in the chamber requires leak-proof engagement of the flanges. Therefore the engaging surfaces of the flanges must be machined to close tolerances.

If the flanges were to be machined in a shop, using conventional shop equipment such as planers or milling machines, it would be necessary to construct each section of the chamber in several relatively small portions, machine the flange on each of these portions separately in a shop, ship the pre-machined portions to the chamber site in an unassembled condition, and then assemble the pre-machined portions at the site, using matched holes, drift pins, etc.

Methods involving the pre-machining of divided portions of a workpiece limit the accuracy to which large workpieces can be built. This is because when an object or workpiece portion is pre-machined in a shop it is clamped to a table during machining, and upon release the object will generally distort because of the changed stresses which exist in the released condition as compared to the clamped condition. In addition, the portions will distort because they are subjected to changing loads during handling and shipment; they will distort due to inherent creeping in the material to correct for internal stress conditions; and they will become distorted when fixed to adjacent parts of the structure initially fabricated to a lesser degree of accuracy than the machined parts.

The apparatus of the present invention eliminates all of the above-described defects. The subject apparatus allows the entire structure to be machined on site after it has been fully assembled. Accordingly, the structure may be built in the simplest and cheapest way possible, utilizing methods which would be used if dimensional and surface finish accuracy were not required, while still obtaining the desired narrow limits of dimensional accuracy. In addition, the possibility of damage to the machined surfaces during shipment and erection are eliminated.

The embodiment of the subject apparatus described herein is illustrated in conjunction with the machining of a flange on a spherical section of an environmental chamber, but the subject apparatus is not limited to this particular use.

Basically, the illustrated embodiment comprises a frame overlying or alongside the flange surface to be machined, and a pair of wheel means on the frame, each wheel means for riding along the surface to be machined and each spaced a predetermined interval along the surface from the other wheel means, the frame and the wheel means being movable relative to the other in a direction toward or away from the surface to be machined. The apparatus also includes surface machining means on said frame between the wheel means and positionable in a plane parallel to a predetermined reference plane, means for moving the frame along the flange surface, and means responsive to variations in the surface from a plane parallel to the predetermined reference plane for moving the frame relative to the wheel means so as to adjust the position of the surface machining means and maintain it parallel to the predetermined reference plane, and spaced a predetermined distance therefrom.

Maintaining the surface machining means parallel to and spaced from the predetermined reference plane is accomplished through the utilization of frame-mounted conventional controller means, in this embodiment hydraulically operated but not limited thereto, said controller means controlling movement of the frame relative to the wheel means. The controller means works in conjunction with a bar-like template positioned around the periphery of the workpiece inside of and below the flange, and levelled so that the top surface of the bar lies in the predetermined reference plane. A stylus extending from the controller means rides along this template surface, and, as the frame moves along the flange surface, the stylus traces the configuration of the template top surface, which in this embodiment is level. When the frame and wheel means ride along the flange surface, any variations therein from a plane parallel to the plane of the template surface are manifest by a tendency of the frame-mounted controller means to move toward or away from the stylus. This actuates the controller means to cause a movement of the frame, relative to the wheel means, in a direction to accommodate for the variation and maintain the frame-mounted machining means parallel to and spaced a predetermined distance from the top surface of the template bar.

During the first few passes of the apparatus there will be relatively substantial movement of the frame relative to the wheel means because the surface being machined will have relatively substantial variations therein. As the machining means passes along the surface, it will gradually eliminate these variations until, at the last pass or so, the surface will be virtually level and in the desired plane, so that movement of the frame relative to the wheel means will be substantially negligible.

By utilizing the apparatus described above, a machined surface, within the dimensional accuracy required, can be obtained on extremely large workpieces without the necessity of pre-machining parts of the workpiece in a shop before assembly. Other features and advantages are inherent in the apparatus claimed and disclosed, or will become apparent to those skilled in the art from the following detailed description in conjunction with the accompanying diagrammatic drawings, wherein:

FIGURE 1 is a fragmentary plan view illustrating an embodiment of apparatus, constructed in accordance with the present invention, for field machining an extremely large workpiece;

FIGURE 2 is a side elevational view, partially in section, of the apparatus and workpiece of FIGURE 1;

FIGURE 3 is an enlarged front elevational view of a portion of the apparatus of FIGURE 1;

FIGURE 4 is an enlarged fragmentary side elevational view, partially in section, of part of that portion of the apparatus illustrated in FIGURE 3;

FIGURE 5 is a schematic diagram of hydraulically operated controller means utilized in conjunction with the illustrated embodiment; and FIGURE 6 is an enlarged plan view, partially broken away, of tractor means for the apparatus.

Referring initially to FIGURES 1 and 2, there is indicated generally at 10 a workpiece constituting a portion of a chamber shaped like a spherical section terminating at an upper peripheral flange 11. Horizontally disposed across workpiece 10 and above flange 11 is a boom 12 at one end of which is a frame 13. Referring to FIGURE 3, mounted at opposite ends of frame 13 are a pair of wheel means 14, 15 each for travelling along the top surface 18 of flange 11 at a spaced interval from the other wheel means. Wheel means 14, 15 and frame 13 are mounted for movement, each relative to the other, toward or away from flange top surface 18, in a manner to be described subsequently in detail. Located on frame 13 between wheel means 14 and 15 is surface machining means 16 connected to conventional machining equipment indicated generally at 17 and mounted on frame 13. Machining equipment 17 is illustrated diagrammatically in FIGURES 1 and 2.

As shown in FIGURES 1 and 2, boom 12 is mounted at 21 for rotation about the vertical axis of a post 20. Also rotatably mounted about the vertical axis of post 20 is the inner end portion 25 of a smaller boom 26 having an outer end portion 27 constituting conventional friction drive tractor means connected by a coupling bar 28 to frame 13 on boom 12. Tractor means 27 propels itself along flange top surface 18 and pulls frame 13 along behind, causing boom 12 to rotate about the vertical axis of post 20. As frame 13 moves along surface 18, machining means 16 may machine the underlying portion of the surface.

A typical conventional, self-propelled, friction drive tractor means 27 is illustrated more clearly in FIGURE 6. Referring first to FIGURE 1, located at the end of boom 26 is a plate 101 below which are a pair of conventional friction wheels 102, 103. Referring now to FIGURE 6, wheels 101, 102 are mounted on respective axles 104, 105 suspended from plate 101 by conventional means such as pillow blocks 106. Axles 104, 105 are driven by conventional chain and sprocket means in turn driven by conventional motor means.

More specifically, axles 104, 105 each mount a respective sprocket 108, 109 driven by a respective chain 110, 111 driven by a respective second sprocket 112, 113 mounted on a shaft 107 suspended from plate 101 by conventional means, such as pillow blocks 114, and driven by conventional motor means 115.

Located at an end of boom 12 opposite frame 13 is a counterweight 22 which offsets the considerable weight of machining equipment 17 so that the weight on boom 12 is taken by center post 20 rather than by flange 11. Counterweight 22 is slightly lighter than the weight on frame 13 to maintain sufficient weight or downward force on machining means 16 to overcome the back or upward thrust of the machining means.

Frame 13 includes a pair of end portions 30, 31 and a connecting horseshoe-shaped portion 32 (FIGURES 1–4). Mounted on end portions 30, 31 are hydraulic cylinders 36, 37 respectively. Each cylinder includes a piston 38 from which a piston rod 39 extends downwardly, terminating at a respective wheel means, e.g. 14. When fluid is introduced into a cylinder above piston 38, the latter and piston rod 39 are urged downwardly, relative to the cylinder, toward flange surface 18, but because piston rod 39 is connected to wheel means 14 resting upon flange surface 11, the wheel means, piston rod 39 and piston 38 are prevented from moving toward the surface. Accordingly, the force urging piston 38 downwardly is manifest by a movement of cylinder 36 and connected frame 13 upwardly, relative to piston 38, and in a direction away from the flange 18. Introduction of fluid into the cylinders below piston 38 has the opposite effect, that is, frame 13 moves toward the flange 11 while the wheel means 14, 15 remain stationary.

Introduction of fluid into cylinders 36, 37 is determined by frame-mounted controller means indicated diagrammatically at 40 (FIGURE 4). Extending downwardly from controller means 40 is means for sensing a predetermined surface configuration, in the form of a stylus rod 42 terminating at a channel-shaped stylus 41 which rides along the top surface 45 of a bar-like template 46 mounted on a member 47 extending around the periphery of the workpiece 10, inside the latter, and supported by a plurality of peripherally spaced brackets 48. Located around stylus rod 42 is a coil spring 43 which normally maintains stylus 41 in engagement with top surface 45 of template 46. Template 46 is leveled with conventional precision equipment so that top surface 45 lies in a predetermined reference plane. Controller means 40, cylinders 36, 37 and elements associated therewith are provided to maintain surface machining means 16 in a plane parallel to and spaced a predetermined distance from the predetermined reference plane defined by top surface 45 of template 46. Accordingly, the top surface 18 of flange 11 will be machined by machining means 16 so that the entire finished machined surface 18 lies in a single plane parallel to the predetermined reference plane of top surface 45 on template 46.

As frame 13 together with machining head 16 moves along flange top surface 18, any variations in surface 18 from the plane parallel to the predetermined reference plane is manifest by a tendency of wheel means 14, 15 to follow these variations; and frame 13 and machining means 16 would ordinarily follow along. However, any tendency of frame 13 to move relative to flange surface 18 is accompanied by a similar tendency of controller means 40 to move relative to stylus 41. This actuates the controller means so as to introduce fluid into cylinders 36, 37 for movement of frame 13 and frame-mounted machining means 16 in a direction opposite that in which they would move as a normal result of variations in flange surface 18. The net result is to maintain the machining means in the same plane, parallel to and spaced a predetermined distance from the reference plane, no matter how the unfinished surface 18 initially varies.

More specifically, referring to FIGURE 5, stylus rod 42 is operatively connected to valve means 50 for cylinder 36. Communicating with valve means 50 is an inlet line 51 leading from a fluid source. A line 52 connects valve means 50 to an inlet in cylinder 36 located below piston 38, and another line 53 connects valve means 50 to an inlet in cylinder 36 located above piston 38. Leading from valve means 50 is outlet line 54. When frame 13 and controller means 40 tend to move downwardly relative to stylus 41, stylus rod 42 actuates valve means 50 so that fluid flows from line 51 through valve means 50 and line 53 into cylinder 36 above piston 38, thereby urging piston 38 downwardly relative to cylinder 36, but in effect causing cylinder 36, and frame 13 to move upwardly, and accordingly raising machining means 16 relative to the wheel means.

When frame 13 and controller means 40 tend to move upwardly relative to stylus 41, rod 42 actuates valve means 50 so that fluid entering valve means 50 from line 51 flows outwardly therefrom through line 52 into cylinder 36 below piston 38 so as to urge piston 38 upwardly, but, in effect, causing cylinder 36 and frame 13 to move downwardly and thereby move the machining means downwardly relative to the wheel means.

The controller means is operative to urge the frame 13 upwardly, only in response to a variation in surface 18 below a plane parallel to the predetermined reference plane, and vice-versa. Stylus rod 42 is also operatively connected to valve means 58 for the other cylinder 37, said connection and operation being identical to that of valve means 50 for cylinder 36. Two valve means and two cylinders, one at each end of the frame, are provided to prevent tipping of machining means 16. Both frame end portions 30, 31 are thus maintained at the same height which prevents the machining means from tipping toward one of the end portions.

Machining means 16 may be initially adjusted in a desired location relative to flange surface 18 by hand wheels 59, 60, 61 on equipment 17, which control the horizontal and vertical positioning of the machining means.

Although the illustrated embodiment constitutes apparatus for machining the top surface of a circular flange on a large workpiece, the invention is not limited thereto. The invention may be utilized to machine vertically disposed as well as horizontally disposed surfaces, and may be used to machine linear as well as curvilinear surfaces. In addition, the invention may be utilized to machine surfaces other than planar. It will machine any configuration in accordance with whatever is the configuration of the template being traced by the stylus.

The foregoing detailed description has been given for clearness of understanding only, and no unnecessary limitations should be understood therefrom, as modifications will be obvious to those skilled in the art.

What is claimed is:

1. In apparatus for field machining a surface of a workpiece:
   a boom;
   a frame at one end of said boom;
   said frame being located adjacent said surface to be machined when the apparatus is in an operative position;
   means for moving said frame-end of the boom along said surface;
   a pair of wheel means each at an opposite end of said frame and each for riding on the surface to be machined at a spaced interval from the other wheel means;
   a pair of fluid operated cylinder means on said frame, one for each wheel means;
   each of said cylinder means being axially disposed transverse to the axis of said wheel means;
   a piston in each cylinder means;
   a piston rod extending from each cylinder means to a respective wheel means and connected thereto;
   means, mounted on said frame between said wheel means, for machining said surface at the interval between said wheel means;
   means for sensing a predetermined surface configuration;
   and means, connected to said sensing means, responsive to a variation in said surface to be machined from said predetermined configuration for urging each of said pistons in the direction of said variation.

2. In apparatus as recited in claim 1 and comprising:
   tractor means for traveling along said surface;
   and coupling means, extending between said tractor means and said frame, for moving the frame with the tractor means.

3. In apparatus as recited in claim 1 wherein:
   said boom is horizontally disposed;
   said apparatus comprising means mounting said boom for rotation about a vertical axis;
   and a counterweight at the other end of said boom opposite said frame, said counterweight being slightly less than the weight at said frame to maintain sufficient weight on said surface machining means to offset the back thrust thereof.

4. In apparatus as recited in claim 1 wherein:
   said frame includes a pair of end portions and a connecting portion therebetween;
   each of said cylinder means being located at a respective end portion;
   each of said wheel means being in alignment with a respective cylinder means;
   said surface machining means being centrally located between said wheel means;
   said means for urging said pistons comprising means, including valve means for each cylinder means, for preventing tipping of the surface machining means toward one of the frame end portions.

5. In an apparatus for field machining a surface of a workpiece:
   a frame positionable adjacent said surface to be machined;
   a pair of wheel means each at an opposite end of said frame and each for riding on the surface to be machined at a spaced interval from the other wheel means;
   a pair of fluid operated cylinder means on said frame, one for each wheel means;
   each of said cylinder means being axially disposed transverse to the axis of said wheel means;
   a piston in each cylinder means;
   a piston rod extending from each cylinder means to a wheel means and connected thereto;
   means, mounted on said frame between said respective wheel means, for machining said surface at the interval between said wheel means;
   means for moving said frame along said surface;
   means for sensing a predetermined surface configuration;
   and means, connected to said sensing means, responsive to a variation in said surface to be machined from said predetermined configuration for urging each of said pistons in the direction of said variation.

6. In apparatus for field machining a surface of a workpiece:
   a boom;
   a frame at one end of said boom;
   said frame being located adjacent said surface to be machined when the apparatus is in an operative position;
   means for moving the frame-end of the boom along said surface;
   a pair of wheel means each at an opposite end of said frame and each for riding on the surface to be machined at a spaced interval from the other wheel means;
   means mounting said wheel means and said frame for movement relative to the other in a direction toward or away from said surface;
   means, mounted on said frame between said wheel means, for machining said surface at the interval between said wheel means;
   means for moving said frame along said surface;
   means for sensing a predetermined surface configuration;
   and means, connected to said sensing means, responsive to a variation in said surface to be machined from said predetermined configuration, for moving said frame, relative to said wheel means, in a direction opposite said variation.

7. In an apparatus for field machining a surface of a workpiece:
   a frame positionable adjacent said surface to be machined;
   a pair of wheel means each at an opposite end of said frame and each for riding on the surface to be machined at a spaced interval from the other wheel means;
   means mounting said wheel means and said frame for movement relative to the other in a direction toward or away from said surface;
   means, mounted on said frame between said wheel means, for machining said surface at the interval between said wheel means;
   means for moving said frame along said surface;
   means for sensing a predetermined surface configuration;
   and means, connected to said sensing means, responsive to a variation in said surface to be machined from said predetermined configuration, for moving said frame, relative to said wheel means, in a direction opposite said variation.

8. In apparatus as recited in claim 5 wherein:

said frame includes a pair of end portions and a connecting portion therebetween;

each of said cylinder means being located at a respective end portion;

each of said wheel means being in alignment with a respective cylinder means;

said surface machining means being centrally located between said wheel means;

said means for urging said pistons comprising means, including valve means for each cylinder means, for preventing tipping of the surface machining means toward one of the frame end portions.

9. Apparatus for field machining a surface of a workpiece, said apparatus comprising:

a boom;

a frame at one end of said boom;

said frame being located adjacent said surface to be machined when the apparatus is in an operative position;

means for moving said frame-end of the boom along said surface;

a pair of wheel means each at an opposite end of said frame and each for riding on the surface to be machined at a spaced interval from the other wheel means;

a pair of fluid operated cylinder means on said frame, one for each wheel means;

each of said cylinder means being axially disposed transverse to the axis of said wheel means;

a piston in each cylinder means;

a piston rod extending from each cylinder means to a respective wheel means and connected thereto;

means, mounted on said frame between said wheel means, for machining said surface at the interval between said wheel means;

template means having a surface with a predetermined configuration;

means for sensing said template surface;

and means, connected to said sensing means, responsive to a variation in said surface to be machined from said predetermined configuration, for urging each of said pistons in the direction of said variation.

10. In apparatus for field machining a surface of a workpiece;

a frame;

a pair of wheel means, each at a respective opposite end of said frame;

a pair of fluid operated cylinder means on said frame, one for each wheel means;

each of said cylinder means being axially disposed transverse to the axis of said wheel means;

a piston in each cylinder means;

a piston rod extending from each cylinder means to a respective wheel means and connected thereto;

surface machining means mounted on said frame between said pair of wheel means;

means including valve means, connected to each of said cylinder means and actuable to urge said pistons in an axial direction;

and means, including means for sensing a predetermined surface configuration, for actuating said piston-urging means in repsonse to a variation, in a surface being machined, from said predetermined surface configuration.

References Cited in the file of this patent

UNITED STATES PATENTS

| | | |
|---|---|---|
| 918,634 | Woods et al. | Apr. 20, 1909 |
| 1,335,512 | Lake | Mar. 30, 1920 |

FOREIGN PATENTS

| | | |
|---|---|---|
| 16,524 | Great Britain | 1908 |